United States Patent
Ha

(10) Patent No.: US 8,692,828 B2
(45) Date of Patent: Apr. 8, 2014

(54) 3-DIMENSIONAL IMAGE PROCESSOR AND PROCESSING METHOD

(75) Inventor: In Woo Ha, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 652 days.

(21) Appl. No.: 12/232,678

(22) Filed: Sep. 22, 2008

(65) Prior Publication Data

US 2009/0213118 A1 Aug. 27, 2009

(30) Foreign Application Priority Data

Feb. 27, 2008 (KR) .................. 10-2008-0017958

(51) Int. Cl.
| | |
|---|---|
| G06T 15/00 | (2011.01) |
| G06T 17/00 | (2006.01) |
| G06T 15/50 | (2011.01) |
| G06T 15/10 | (2011.01) |
| G06F 15/16 | (2006.01) |
| G06F 15/80 | (2006.01) |
| G06K 9/36 | (2006.01) |
| G05B 19/18 | (2006.01) |

(52) U.S. Cl.
USPC ........... 345/424; 345/419; 345/426; 345/427; 345/502; 345/505; 382/276; 382/285; 700/2; 700/4

(58) Field of Classification Search
USPC ............... 345/419–428, 619–622, 502, 505; 700/2, 4, 5; 712/10–15; 463/30–34; 382/173, 276, 285, 302, 304; 715/848–853, 782

See application file for complete search history.

(56) References Cited

U.S. PATENT DOCUMENTS

| | | | | |
|---|---|---|---|---|
| 5,557,711 | A | * | 9/1996 | Malzbender .................. 345/422 |
| 5,933,146 | A | * | 8/1999 | Wrigley ........................ 345/420 |
| 6,346,938 | B1 | | 2/2002 | Chan et al. |
| 6,972,767 | B2 | | 12/2005 | Ishii et al. |
| 7,280,710 | B1 | | 10/2007 | Castro-Pareja et al. |
| 2003/0174132 | A1 | * | 9/2003 | Kunimatsu et al. ........... 345/419 |
| 2007/0024615 | A1 | | 2/2007 | Keller et al. |

(Continued)

FOREIGN PATENT DOCUMENTS

| | | |
|---|---|---|
| JP | 62-160576 | 7/1987 |
| JP | 63-167987 | 7/1988 |

(Continued)

OTHER PUBLICATIONS

Kobayashi H, Nishimura S, Kubota H, Nakamura N, Shigei Y. 1988. "Load balancing strategies for a parallel ray tracing system based on constant subdivision". The Visual Computer. vol. 4. pp. 197-209.*

(Continued)

*Primary Examiner* — Wesner Sajous
*Assistant Examiner* — Andrew Shin
(74) *Attorney, Agent, or Firm* — Staas & Halsey LLP

(57) ABSTRACT

A three-dimensional (3D) image processor and processing method are described. The 3D image processor includes a space division unit to divide a virtual object space where a virtual 3D object is located into a plurality of sub-spaces, and a plurality of processors to correspond to each of the divided sub-spaces and to compute a trajectory of a ray within each of the corresponding sub-spaces, the ray being transmitted into each of the corresponding sub-spaces.

17 Claims, 8 Drawing Sheets

(56) References Cited

U.S. PATENT DOCUMENTS

| | | |
|---|---|---|
| 2007/0154082 A1 | 7/2007 | Rhodes |
| 2007/0206008 A1* | 9/2007 | Kaufman et al. ............. 345/424 |
| 2008/0074420 A1* | 3/2008 | Kuesel et al. ................ 345/426 |
| 2008/0088622 A1* | 4/2008 | Shearer ........................ 345/421 |
| 2008/0158227 A1* | 7/2008 | Reshetov et al. ............ 345/426 |
| 2009/0046099 A1* | 2/2009 | Duca et al. ................... 345/426 |

FOREIGN PATENT DOCUMENTS

| | | |
|---|---|---|
| JP | 2000-20746 | 1/2000 |
| JP | 2001-84401 | 3/2001 |
| KR | 10-0181037 | 12/1998 |
| KR | 2001-0114046 | 12/2001 |
| WO | WO 2008/012199 A2 | 1/2008 |

OTHER PUBLICATIONS

PCT International Search Report for corresponding PCT Application No. PCT/KR2008/006586 dated May 21, 2009, 3 pgs (in English).

Japanese Office Action mailed Dec. 11, 2012 for corresponding Japanese Application No. 2010-548601.

Japanese Office Action mailed Apr. 30, 2013 in corresponding Japanese Application No. 2010-548601.

Takashi Yoshitani et al., "Three-Dimensional (3D) Image Processor and Processing Method", $54^{th}$ National Conference of Information Processing ($1^{st}$ half of 1997), pp. 4-57-4-58.

* cited by examiner

PROCESSOR 1

PROCESSOR 2

3-DIMENSIONAL IMAGE PROCESSOR AND PROCESSING METHOD

CROSS-REFERENCE TO RELATED APPLICATIONS

This application claims the benefit of Korean Patent Application No. 10-2008-0017958, filed on Feb. 27, 2008, in the Korean Intellectual Property Office, the disclosure of which is incorporated herein by reference.

BACKGROUND

1. Field

One or more embodiments of the present invention relate to a three-dimensional (3D) image processor and processing method, and more particularly, to a 3D image processor and processing method using a ray tracing scheme.

2. Description of the Related Art

Three-dimensional (3D) image processing includes a technology for generating images similar to physical images on a plane display such as a television, a monitor, and the like. The 3D image processing may set a virtual 3D space where a virtual 3D object is positioned, and simulate images viewed in an observer's viewpoint according to the relationship between a virtual ray and the virtual 3D object.

3D image processing may be divided into a process for modeling the virtual 3D space and the virtual 3D object and a process for extracting images obtained when the modeled virtual 3D object is projected in the observer's viewpoint. The process for extracting images projected in the observer's viewpoint from the virtual 3D object is generally referred to as 3D rendering.

Ray tracing is one technology for 3D rendering.

In the physical world, rays from at least one light are reflected and/or refracted when striking an object to cause change in a direction and/or intensity of the rays, and the changed rays are aggregated to form the observer's viewpoint.

Ray tracing is a scheme for inversely tracing a trajectory of a ray in the physical world, and a tracing process in which at least one ray is generated from the observer's viewpoint, and the generated at least one ray is reflected and/or refracted when striking the object to thereby cause change in the at least one ray. The ray tracing may set any of the pixels composing the plane display as the observer's viewpoint, and trace changes in the at least one ray generated from each of the pixels to thereby determine each color of the pixels.

In general, the quantity of rays and objects may increase in order to provide a realistic 3D image using ray tracing. The increased number of rays and objects, and thus the 3D rendering using the ray tracing, may require a very large computation quantity.

SUMMARY

One or more embodiments of the present invention provide a 3D image processor and processing method, which may use a new computation algorithm, thereby reducing a computation quantity when using a ray tracing scheme.

One or more embodiments of the present invention provide a 3D image processor and processing method, which may reduce a computation quantity when using a ray tracing scheme and perform computations in parallel, thereby reducing a time required for providing a 3D image.

One or more embodiments of the present invention provide a 3D image processor and processing method, which may reduce a computation quantity when using a ray tracing scheme, thereby providing a 3D image in real time.

One or more embodiments of the present invention provide a 3D image processor and processing method, which may reduce a memory consuming quantity used in a parallel ray tracing scheme.

Additional aspects and/or advantages will be set forth in part in the description which follows and, in part, will be apparent from the description, or may be learned by practice of the invention.

According to an aspect of the present invention, there is provided a three-dimensional (3D) image processor, including: a space division unit to divide a virtual object space where a virtual 3D object is located into a plurality of sub-spaces; and a plurality of processors to correspond to each of the divided sub-spaces and to compute a trajectory of ray within each of the corresponding sub-spaces, the ray transmitted into each of the corresponding sub-spaces.

According to another aspect of the present invention, there is provided a 3D image processing method, including: dividing a virtual object space where a virtual 3D object is located into a plurality of sub-spaces; and computing a trajectory of ray within each of the divided sub-space when the ray is transmitted into each of the divided sub-spaces.

In this instance, the computing may be performed in parallel with respect to another sub-space different from the sub-space into which the ray is transmitted.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
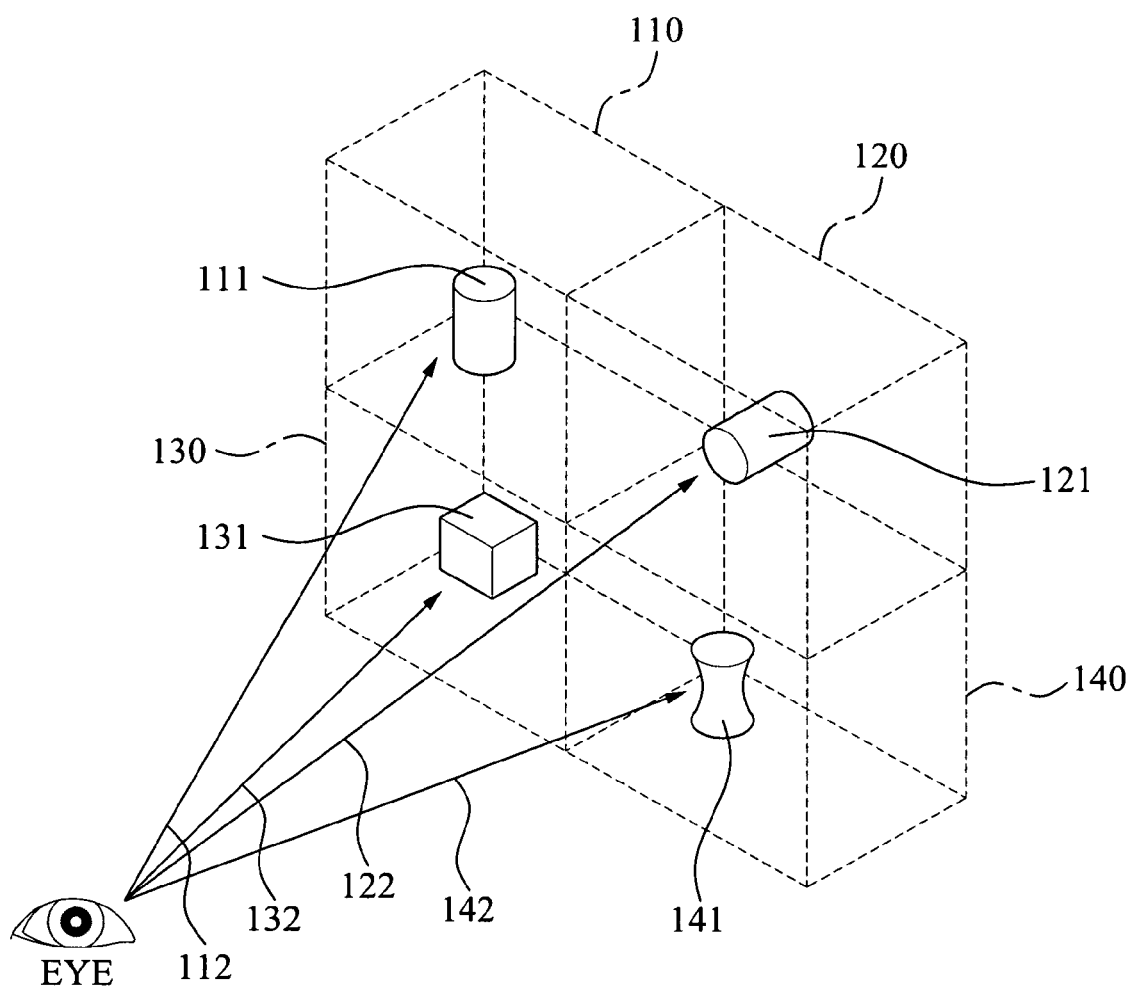
FIG. 1 illustrates a three-dimensional (3D) image processing method, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 illustrates a three-dimensional (3D) image processing method, according to an embodiment of the present invention.

Referring to FIG. 1, a virtual object space, where virtual 3D objects are located, may be divided into four sub-spaces 110, 120, 130 and 140.

A ray tracing scheme may be performed such that a trajectory of rays, transmitted into the virtual object space from each of the pixels on a display screen, may be computed when each of the pixels is assumed to be an eye.

The 3D image processing method may maintain virtual model data of 3D objects with respect to each of the divided four sub-spaces 110, 120, 130, and 140, and may compute a trajectory of an incident ray using the virtual model data with respect to each of the divided four sub-spaces 110, 120, 130, and 140.

A processor (not shown) may be assigned to each of the four divided sub-spaces 110, 120, 130 and 140. For example, processor (1) may be assigned to the sub-space 110.

A virtual object 111 may be located within the sub-space 110. 3D model data of the sub-space 110 including the virtual object 111 may be stored in buffer memory (1) (not shown). Processor (1) may compute a trajectory of rays transmitted into the sub-space 110 using the 3D model data of the sub-space 110 stored in buffer memory (1).

A ray 112 is transmitted from a corresponding pixel into the sub-space 110. Processor (1) may compute a trajectory within the sub-space 110 of the ray 112. The 3D model data of the sub-space 110 stored in buffer memory (1) may include coordinates of points composing a boundary of the virtual object 111. Processor (1) may trace whether the ray 112 strikes the virtual object 111 according to an advancing direction of the ray 112.

The ray 112 may be reflected at a point where the ray 112 strikes the virtual object 111, or transmitted or refracted into the virtual object 111. The ray 112 may be divided into a reflection ray, a transmission ray, and a shadow ray at the point where the ray 112 strikes the virtual object 111. The shadow ray may be referred to as a direct ray. An intensity of a ray may be measured using the shadow ray when ray from light is not screened by other objects.

Processor (1) may compute coefficients of the reflection ray, the transmission ray, and the shadow ray at the point where the ray 112 strikes the virtual object 111, and may store, in buffer memory (1) or another memory, each of the computed coefficients of the respective rays together with the coordinates of the point where the ray 112 strikes the virtual object 111.

For the convenience of description according to the present embodiment of the present invention, a reflection ratio of the reflection ray and a transmission ratio of the transmission ray may be designated as a reflection coefficient and a transmission coefficient, respectively. These designations are used merely for the purpose of explanation and without intending to limit the scope of the present invention.

Processor (1) may store the coordinates of the point where the ray 112 strikes the virtual object 111, the reflection coefficient, the transmission coefficient, and the shadow coefficient. Processor (1) may keep tracing a trajectory of the reflection ray according to an advancing direction of the reflection ray. When the reflection ray strikes another 3D object, processor (1) may compute a reflection coefficient, a transmission coefficient, and a shadow coefficient at a point where the reflection ray strikes the other 3D object. When the reflection ray strikes a boundary of the sub-space 110, processor (1) may store coordinates of a point where the reflection ray strikes the boundary of the sub-space 110, and terminate the computation.

As described above, sub-space 110, virtual object 111, and ray 112 have been described, however, identical descriptions may be applied with respect to the other sub-spaces, virtual objects, and rays. For example, processors (2), (3), and (4) may be assigned to sub-spaces 120, 130, and 140, respectively.

A virtual object 121 may be located within the sub-space 120. 3D model data of the sub-space 120 including the virtual object 121 may be stored in buffer memory (2) (not shown). Processor (2) may compute a trajectory of rays transmitted into the sub-space 120 using the 3D model data of the sub-space 120 stored in buffer memory (2). The ray 122 may be transmitted into the sub-space 120 from a corresponding pixel. Processor (2) may compute a trajectory within the sub space 120 of the ray 122.

A virtual object 131 may be located within the sub-space 130. 3D model data of the sub-space 130 including the virtual object 131 may be stored in buffer memory (3) (not shown). Processor (3) may compute a trajectory of rays transmitted into the sub-space 130 using the 3D model data of the sub-space 130 stored in buffer memory (3). A ray 132 from a corresponding pixel may be transmitted into the sub-space 130. Processor (3) may compute a trajectory within the sub-space 130 of the ray 132.

A virtual object 141 may be located within the sub-space 140. 3D model data of the sub-space 140 including the virtual object 141 may be stored in buffer memory (4) (not shown). Processor (4) may compute a trajectory of rays transmitted into the sub-space 140 using the 3D model data of the sub-space 140 stored in buffer memory (4). A ray 142 from a corresponding pixel may be transmitted into the sub-space 140. Processor (4) may compute a trajectory within the sub-space 140 of the ray 142.

As illustrated in FIG. 1, each single ray of the rays 112, 122, 132, and 142 is transmitted, respectively, into one of the four sub-spaces 110, 120, 130, and 140, however, embodiments of the present invention are not limited thereto. For example, a plurality of rays may be transmitted into a sub-space.

According to one or more embodiments, processors may compute a trajectory of only a single ray for an identical time interval. Specifically, processors (1), (2), and (3) may compute trajectories of the rays 112, 132, and 142, respectively, for the identical time interval.

Figure 2:
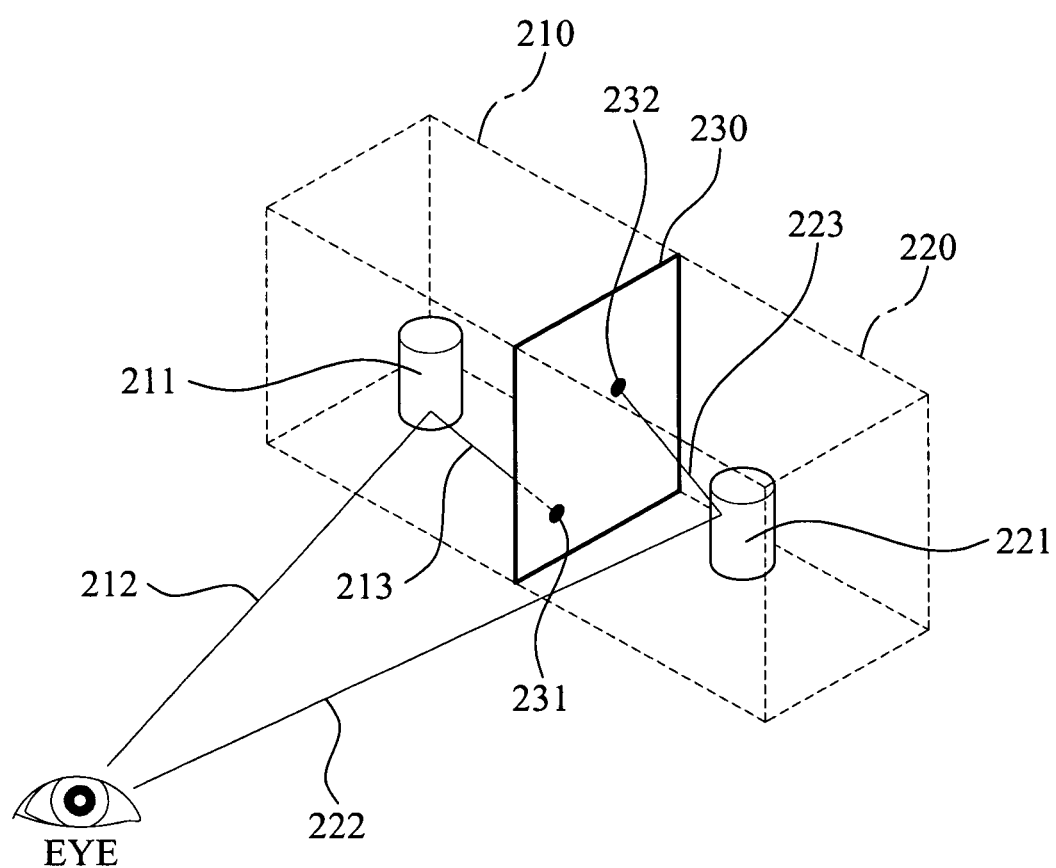
FIG. 2 illustrates a 3D image processing method, according to an embodiment of the present invention.

FIG. 2 illustrates a 3D image processing method, according to another embodiment of the present invention.

Referring to FIG. 2, a 3D virtual space where a 3D virtual object is located is divided into two virtual sub-spaces 210 and 220.

The 3D image processing method computes a trajectory of rays 212 and 222 transmitted into the two sub-spaces 210 and 220 from a specific pixel, when the specific pixel is assumed to be an eye.

Processor (1) (not shown) may be assigned to the sub-space 210. Processor (1) may compute a trajectory of the ray 212 transmitted into the sub-space 210.

A virtual object 211 is located within the sub-space 210. Processor (1) may either store 3D model data of the sub-space 210 including the virtual object 211, or read the 3D model data stored in a buffer memory (not shown).

When a point where the ray 212 strikes a boundary of the virtual object 211 is detected, processor (1) may compute an advancing direction of a ray 213 reflected from the point where the ray 212 strikes the boundary of the virtual object 211, and a reflection ratio of the reflected ray 213. Processor (1) may detect a point 231 where the reflected ray 213 strikes a virtual plane 230 according to the advancing direction of the ray 213. Here, the virtual plane 230 is a plane indicating a boundary of the sub-spaces 210 and 220.

Processor (1) may store the advancing direction of the ray 213 at the point 231 and the reflection ratio of the ray 213 and terminate the computation sequence when the point 231 where the ray 213 strikes the virtual plane 230 is detected. Also, processor (1) may store a reflection number of the ray 213 until the ray 213 reaches the point 231. The ray 213 is a ray reflected at the point where the ray 212 strikes the virtual object 211, and thereby the reflection number of the ray 213 is one.

Processor (2) (not shown) may be assigned to the sub-space 220. Processor (2) computes a trajectory of the ray 222 transmitted into the sub-space 220.

A virtual object 221 may be located within the sub-space 220. Processor (2) may either store 3D model data of the sub-space 220 including the virtual object 221, or read the 3D model data stored in a buffer memory (not shown).

The 3D model data of the sub-space 220 may include information about coordinates of points forming a boundary of the virtual object 221. Processor (2) may detect whether a point where the ray 222 strikes the boundary of the virtual object 221 exists according to an advancing direction of the ray 222.

Processor (2) may compute an advancing direction of a ray 223 reflected at the point where the ray 222 strikes the boundary of the virtual object 221 and a coefficient of the reflected ray 223 when the point where the ray 222 strikes the boundary of the virtual object 221 is detected. Processor (2) may detect whether a point 232 where the ray 223 strikes the virtual plane 230 exists.

Processor (2) may compute an advancing direction of the ray 223 at the point 232 and a coefficient of the ray 223, and terminate the computation sequence. Also, processor (2) may store a reflection number of the ray 223 until the ray 223 reaches the point 232. The ray 223 is a ray reflected at the point where the ray 222 strikes the virtual object 221, and thereby the reflection number of the ray 223 is one.

Figure 3:
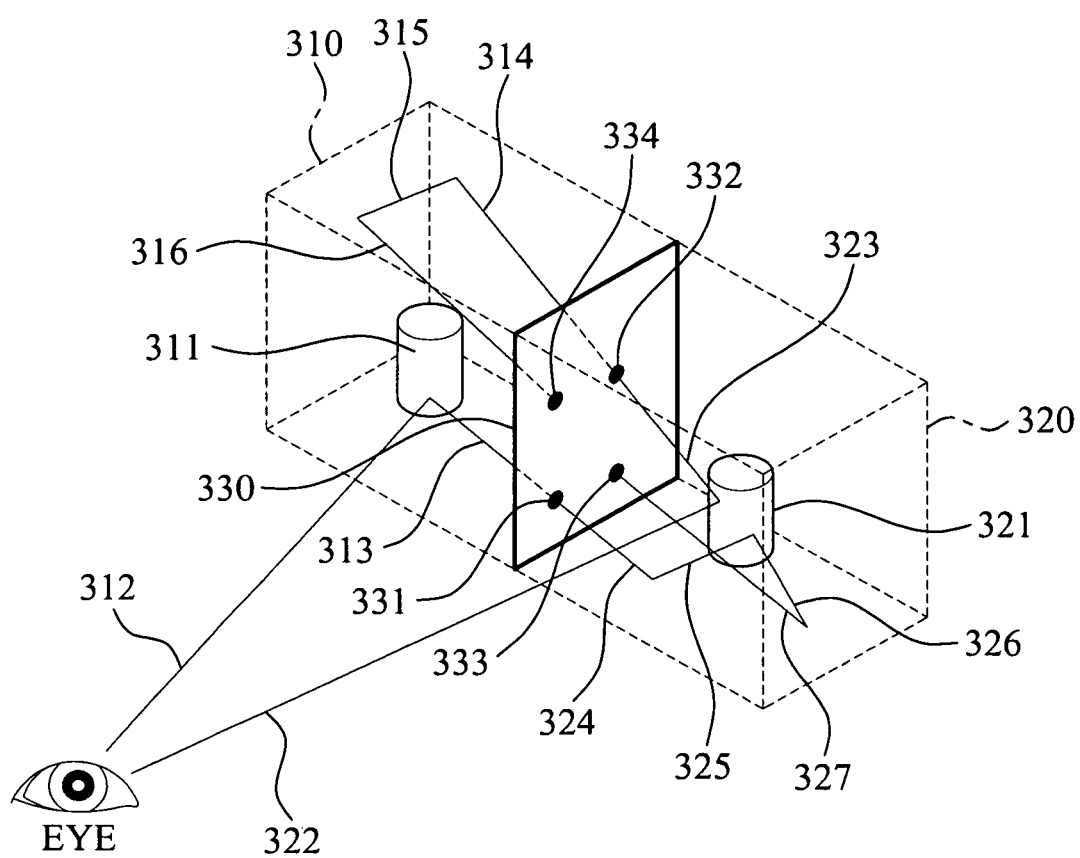
FIG. 3 illustrates a 3D image processing method, according to an embodiment of the present invention.

FIG. 3 illustrates a 3D image processing method, according to another embodiment of the present invention.

Referring to FIG. 3, a 3D virtual space where a 3D virtual object is located may be divided into two sub-spaces 310 and 320.

Processor (1) (not shown) may be assigned to a sub-space 310, and processor (2) (not shown) may be assigned to a sub-space 320. Processor (1) may compute a trajectory of rays 312 and 313 within the sub-space 310 for a first time interval. When a point where the ray 313 strikes a virtual plane 330 is detected, processor (1) may store an advancing direction or coefficient of the ray 313 at a point 331, and terminate the computation performed for the first time interval.

Processors (1) and (2) may compute trajectories of rays within each of the sub-spaces 310 and 320. Processors (1) and (2) may perform the computations in parallel.

Processor (1) may compute trajectories within the sub-space 310 of rays 314, 315, and 316 transmitted into the sub-space 310 from a point 332 for a second time interval. An advancing direction and coefficient of the ray 314 at the point 332 may be identical to an advancing direction and coefficient of a ray 323 at the point 332. Processor (1) may detect whether a point where the ray 314 strikes either a virtual object 311 or a boundary of the sub-space 310 exists.

When a point where the ray 314 strikes a rear boundary of the sub-space 310 is detected, processor (1) may compute an advancing direction and coefficient of the reflected ray 315. In a similar manner, processor (1) may compute an advancing direction and coefficient of the ray 316 reflected at a point where the ray 315 strikes a left boundary of the sub-space 310.

When a point where the ray 316 strikes the virtual plane 330 is detected, processor (1) may store an advancing direction and coefficient of the ray 316 at a point 334, and terminate the computation sequence performed for the second time interval.

Processor (2) may compute trajectories within the sub-space 320 of rays 324, 325, 326, and 327 transmitted into the sub-space 320 from the point 331 for the second time interval. An advancing direction and coefficient of the ray 324 at point 331 may be identical to an advancing direction and coefficient of the ray 313 at point 331. Processor (2) may detect whether a point where the ray 324 strikes either a virtual object 321 or a boundary of the sup-space 320 exists according to the advancing direction of the ray 324.

When a point where the ray 324 strikes a bottom boundary of the sub-space 320 is detected, processor (2) may compute an advancing direction and coefficient of the reflected ray 325. When a point where the ray 325 strikes a boundary of the virtual object 321 is detected, processor (2) may compute an advancing direction and coefficient of the reflected ray 325. When a point where the ray 326 strikes a right boundary of the sub-space 320 is detected, processor (2) may compute an advancing direction and coefficient of the reflected ray 327. When a point 333 where the ray 327 strikes the virtual plane 330 is detected, processor (2) may store the advancing direction and coefficient of the ray 327 at the point 333, and terminate the computation performed for the second time interval.

Processor (1) may compute trajectories of rays within the sub-space 310 based on 3D model data of the sub-space 310. In this instance, processor (1) may reduce a storage volume of a memory required for the computation, since there is no need for considering 3D model data of the sub-space 320. Also, in the ray tracing scheme, a point where a ray strikes a virtual object may be detected by comparing location coordinates depending on an advancing direction of the ray and coordinates of 3D model data, and thereby a time required for computing the trajectory of the ray may be reduced along with a reduction in an amount of the considered 3D model data. Processor (1) may compute the trajectory of the ray from the 3D model data of the sub-space 310. Thereby, a time required for the computation may be reduced relative to a case that considers all of the 3D model data of the sub-spaces 310 and 320.

Also, processor (2) may compute trajectories of rays within the sub-space 320 based on the 3D model data of the sub-space 320. In this instance, processor (2) may reduce the storage volume of memory required for computations, since there is no need to consider 3D model data of the sub-space 310. Processor (2) may compute the trajectory of the ray from the 3D model of the sub-space 320, and thereby a time required for the computation may be reduced relative to the case in which all of the 3D model data of sub-spaces 310 and 320 is considered.

According to another embodiment of the present invention, an entire virtual space may be divided into P sub-spaces, and a single processor may be assigned to each of the P sub-spaces, so that a trajectory of the ray can be computed in parallel. In this instance, each of the processors may require a memory storage having a volume identical to 1/P of a memory storage volume required for a conventional processor. Each of the processors may perform a computation that is identical to 1/P of a computation performed by the conventional processor. Each of the processors may perform the computation within a time that is identical to 1/P of the time required for a conventional processor to perform the computation.

According to the present embodiment of the present invention, P processors may divide all rays having to be processed in the 3D image processing in parallel, and each of the processors may perform the computation P times faster than the conventional processor, thereby reducing a time required for the entire 3D image processing by $1/P^2$.

Referring again to FIG. 3, processor (1) may detect whether a ray transmitted into the sub-space 310 from the virtual plane 330 exists after terminating the computation performed for the first time interval. As illustrated in FIG. 3, the ray 314 transmitted from the sub-space 320 into the sub-space 310 after passing through the point 332 is detected, processor (1) may compute trajectories within the sub-space 310 of the detected ray 314 and the reflected rays 315 and 316.

When the reflected rays satisfy a termination condition, processors may terminate a process for computing a trajectory of the corresponding ray. When each of the time intervals is terminated, processor (1) may detect whether a ray, transmitted from the virtual plane 330 into the sub-space 310, exists. Processor (1) may determine whether the ray transmitted from the virtual plane 330 into the sub-space 310 satisfies a termination condition, and processor (1) may refrain from performing computations related to the ray transmitted from the virtual plane 330 into the sub-space 310 when the ray transmitted from the virtual plane 330 into the sub-space 310 satisfies the termination condition.

Processor (1) may detect whether another ray transmitted from a pixel into the sub-space 310 exists when the ray transmitted from the virtual plane 330 into the sub-space 310 satisfies the termination condition. Although not illustrated in detail in FIG. 3, in the ray tracing scheme, a plurality of rays are transmitted into a 3D virtual space from a single pixel to thereby compute trajectories of the incident rays. Processor (1) may detect the following incident ray to thereby compute a trajectory within the sub-space 310 of the detected incident ray when a computation process with respect to a single incident ray is terminated.

As examples of the termination condition, each of rays may be reflected at a point where each of the rays strikes the virtual object, and an intensity of the reflected ray may be reduced. The termination condition may be a condition in which an intensity of the reflected ray is smaller than a reference value. Also, the termination condition may be a condition in which an accumulated number of the rays reflected at the point where the ray strikes the virtual object is greater than the reference value. A time point determined whether the termination condition is satisfied may be a time point when the ray strikes the virtual object, or a time point when each of the time intervals is terminated.

Figure 4:
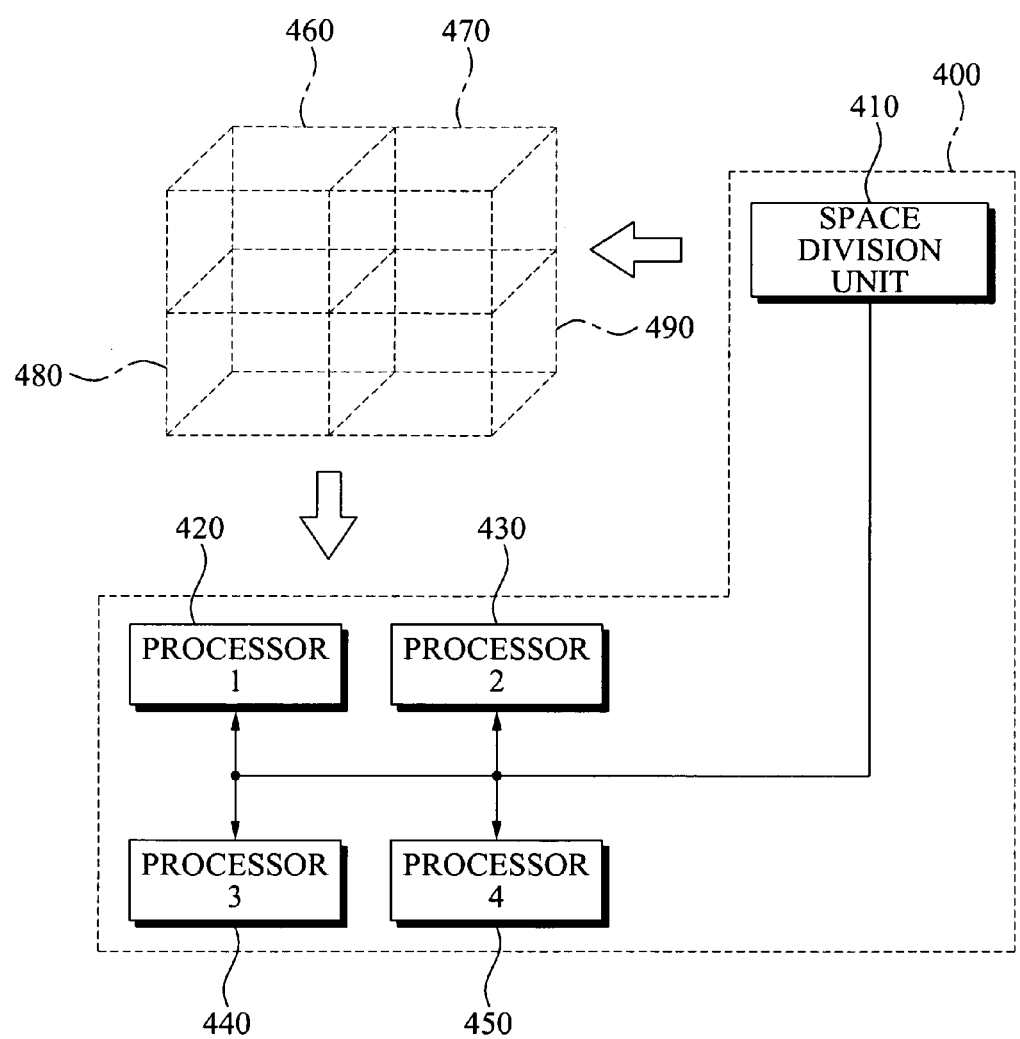
FIG. 4 illustrates a 3D image processor performing the 3D image processing method of FIG. 1.

FIG. 4 illustrates a 3D image processor 400 performing the 3D image processing method of FIG. 1, although other image processors may equally perform the 3D image processing method of FIG. 1.

Referring to FIG. 4, the 3D image processor 400 may include, for example, a space division unit 410, and four processors (1, 2, 3, and 4) 420, 430, 440, and 450.

The space division unit 410 may divide a virtual object space where a virtual 3D object is located into four sub-spaces, for example, 460, 470, 480, and 490. The space division unit 410 may transmit information about the divided sub-spaces 460, 470, 480, and 490 to each of processors (1, 2, 3, and 4) 420, 430, 440, and 450.

The space division unit 410 may assign the divided sub-spaces 460, 470, 480, and 490 to processors (1, 2, 3, and 4) 420, 430, 440, and 450, respectively.

Processor (1) 420 may correspond to sub-space 460. Processor (1) 420 may compute a trajectory within the sub-space 460 of the ray transmitted into the corresponding sub-space 460.

Processor (2) 430 may correspond to sub-space 470. Processor (2) 430 may compute a trajectory within the sub-space 470 of the ray transmitted into the corresponding sub-space 470.

Processor (3) 440 may correspond to sub-space 480. Processor (3) 440 may compute a trajectory within the sub-space 480 of the ray transmitted into the corresponding sub-space 480.

Processor (4) 450 may correspond to sub-space 490. Processor (4) 450 may compute a trajectory within the sub-space 490 of the ray transmitted into the corresponding sub-space 490.

When the ray within the sub-space 460 is transmitted into the sub-space 480, processor (1) 420 may store trajectory information of the ray, and terminate the computation process. Processor (3) 440 corresponding to the sub-space 480 of a new incident ray may compute a trajectory of the incident ray within the sub-space 480.

The stored trajectory information may include an angle obtained when the ray is transmitted into the sub-space 480, and an intensity obtained when the ray is transmitted into the sub-space 480.

Each of processors (1, 2, 3, and 4) 420, 430, 440, and 450 may compute trajectories of the ray within the sub-spaces 460, 470, 480, and 490 corresponding to each of processors (1, 2, 3, and 4) 420, 430, 440, and 450. Each of processors (1, 2, 3, and 4) 420, 430, 440, and 450 may detect whether rays transmitted from sub-spaces 460, 470, 480, and 490 into the sub-spaces 460, 470, 480, and 490 exist after the time interval is terminated. For example, when a ray transmitted from sub-spaces 460, 480, and/or 490 into the sub-space 470 is detected, processor (2) 430, corresponding to the sub space 470, may compute a trajectory of the incident ray. When a ray transmitted from sub-spaces 460, 480, and/or 490 into the sub-space 470 is not detected, processor (1) 430 corresponding to the sub-space 470 may detect another ray transmitted from a pixel into the sub-space 470.

Each of processors (1, 2, 3, and 4) 420, 430, 440, and 450 may compute trajectories of the ray in parallel with respect to each of the corresponding sub-spaces 460, 470, 480, and 490.

The space division unit may set a boundary between the divided sub-spaces 460, 470, 480, and 490, for example, as a virtual plane. When a ray within the sub-space 460 is transmitted into the sub-space 480, processor (3) 440 corresponding to the sub-space 480 may set a point where the ray strikes the virtual plane as a virtual node. Processor (3) 440 may compute a trajectory of an incident ray when the ray is assumed to be transmitted from the virtual node into the sub-space 480.

Processor (1) 420 may compute a trajectory of a ray changed by collision between virtual 3D objects within the ray transmitted into the sub-space 460 and the sub-space 460. In this instance, the ray may be reflected or refracted by collision with the virtual 3D object. The refraction in which a ray advances into the virtual 3D object may be referred to as transmission.

Processor (1) 420 may terminate a trajectory computation of the ray when a number of collisions between the ray and the virtual 3D object is greater than a threshold. Processor (1) 420 may accumulate and store the number of collisions between the ray and the virtual 3D object, and determine whether the stored number is greater than a threshold.

Processor (2) 430 may terminate the computation of trajectory of the ray when an intensity of each color of the ray is less than a threshold. The ray may be composed of red (R), green (G), and blue (B). Processor (2) 430 may compute a transmission ray, a reflection ray, and a shadow ray whenever the ray collides with the virtual 3D object.

Processor (2) 430 may determine whether the reflection ray collides with another virtual 3D object according to an advancing direction of the reflection ray. Processor (2) 430 may compute a new transmission coefficient, shadow coefficient, and a reflection coefficient by a new collision between the reflection ray and another virtual 3D object.

In this instance, processor (2) 430 may store a product of transmission coefficients generated by the preceding collision, and a product of reflection coefficients generated by the preceding collision. A product of the stored transmission coefficients and the reflection coefficients may denote an ancestor.

Processor (2) 430 may compute a final color with respect to pixels of the ray by multiplying the product of the coefficients of the ancestor of the ray by a finally determined reference color (referred to as a color of a leaf node). When an intensity of each color of a current reflection ray, that is, a product of the reflection coefficients of the ancestors is less than a threshold, processor (2) 430 may terminate a computation with respect to the trajectory of the ray, and add the coefficients stored as the ancestors of the ray to thereby compute a final intensity (or brightness) with respect to the pixel of the ray. In this instance, the leaf node may designate a color formed in a single pixel by a single ray. In the single pixel, a color may be formed by a plurality of rays, and thereby colors formed by a plurality of leaf nodes are added together, so that a color of the pixel is finally determined.

The space division unit 410 may divide the virtual object space into four sub-spaces 460, 470, 480, and 490 based on the relative complexity of each region of the virtual object space. The space division unit 410 may divide the virtual object space so that the relative complexity of each of the divided sub-spaces 460, 470, 480, and 490 is similar to each of the others.

In the ray tracing scheme, a plurality of rays may be transmitted into the virtual object space from a single pixel. The space division unit 410 may divide the virtual object space so that a frequency, in which the rays are transmitted into each of the sub-spaces 460, 470, 480, and 490, can be equalized. When the frequency is equalized, the computation load of processors (1, 2, 3, and 4) 420, 430, 440, 450, corresponding to each of the sub-spaces 460, 470, 480, and 490 may be evenly assigned, thereby improving parallelism of the computation.

Figure 5:
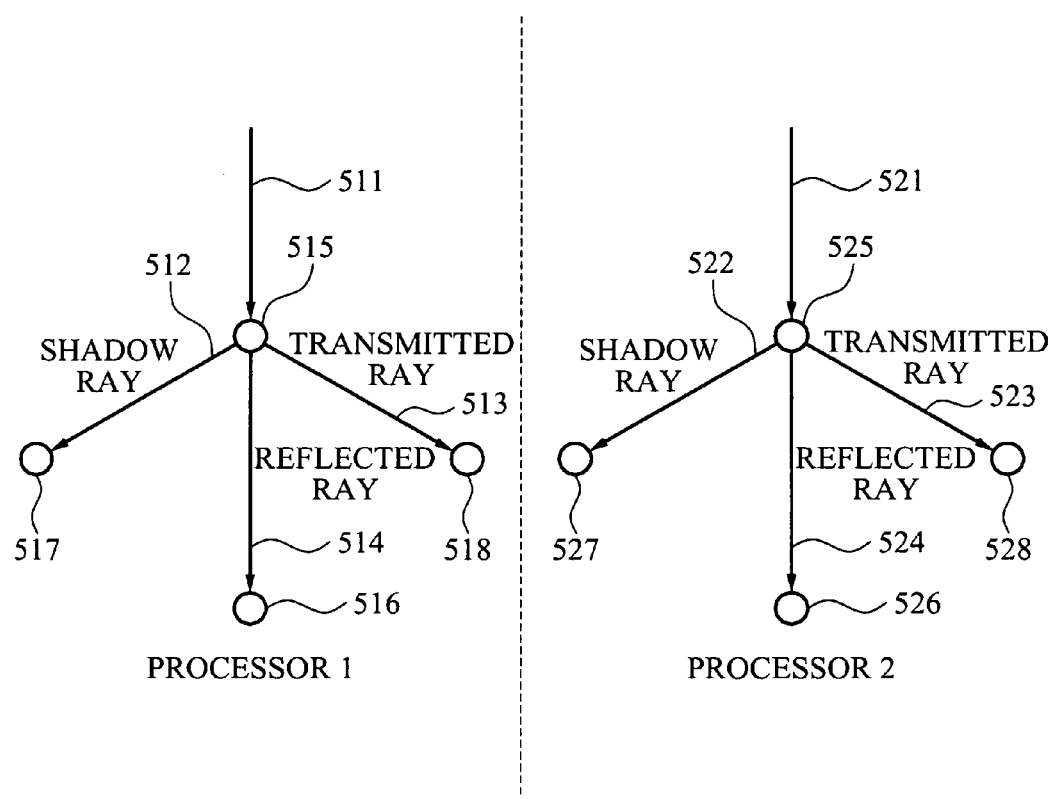
FIG. 5 illustrates a computation process performed during a first time interval according to at least the embodiment of FIG. 3.

FIG. 5 illustrates a computation process performed during a first time interval, according to the embodiment of FIG. 3.

Referring to FIGS. 3 and 5, processor (1) may be assigned to the sub space 310, and processor (2) may be assigned to the sub-space 320.

An arrow 511 corresponds to the ray 312 transmitted into the sub-space 310.

A node 515 corresponds to a point where the ray 312 collides with the virtual object 311.

Processor (1) may compute an advancing direction and coefficient of the reflection ray 313 based on the advancing direction and the intensity of the ray 312 and information about the boundary and transparence of the virtual object 311, compute an advancing direction and coefficient of the shadow ray, and then compute an advancing direction and coefficient of the transmission ray.

An arrow 512 corresponds to the shadow ray, and a node 517 corresponds to a shadow coefficient. An arrow 513 corresponds to the transmission ray, and the node 518 corresponds to a transmission coefficient.

An arrow 514 corresponds to the reflection ray 313. When the reflection ray 313 strikes the virtual plane 330, processor (1) may store a coefficient and advancing direction of the ray 313 together with coordinates of the point 331. In this instance, processor (1) may store the shadow coefficient of the node 517 acting as an ancestor of the ray 313 and the transmission coefficient of the node 518 together with the coordinates of the point 331. Processor (1) may store information about the ray 313 and the ancestor together with the coordinates of the point 331, and terminate a computation process performed for the first time interval. A node 516 corresponds to the point 331.

An arrow 521 corresponds to a ray 322 transmitted into the sub-space 320.

A node 525 corresponds to a point where the ray 322 collides with the virtual object 321.

Processor (2) may compute an advancing direction and coefficient of a reflection ray 323 based on the advancing direction and the intensity of the ray 322 and information about the boundary and transparence of the virtual object 321, compute an advancing direction and coefficient of the shadow ray, and then compute an advancing direction and coefficient of the transmission ray.

An arrow 522 corresponds to the shadow ray, and a node 527 corresponds to a shadow coefficient. An arrow 523 corresponds to the transmission ray, and the node 528 corresponds to a transmission coefficient. An arrow 524 corresponds to the reflection ray 323. When the ray 323 strikes the virtual plane 330, processor (2) may store a coefficient and advancing direction of the ray 323 together with coordinates of the point 332. In this instance, processor (2) may store a shadow coefficient of the node 527 acting as an ancestor of the ray 323 and a transmission coefficient of the node 528 together with the coordinates of the point 332. Processor (2) may store information about the ray 323 and ancestor information together with the coordinates of the point 332, and terminate the computation process performed for the first time interval. A node 526 corresponds to the point 332.

Figure 6:
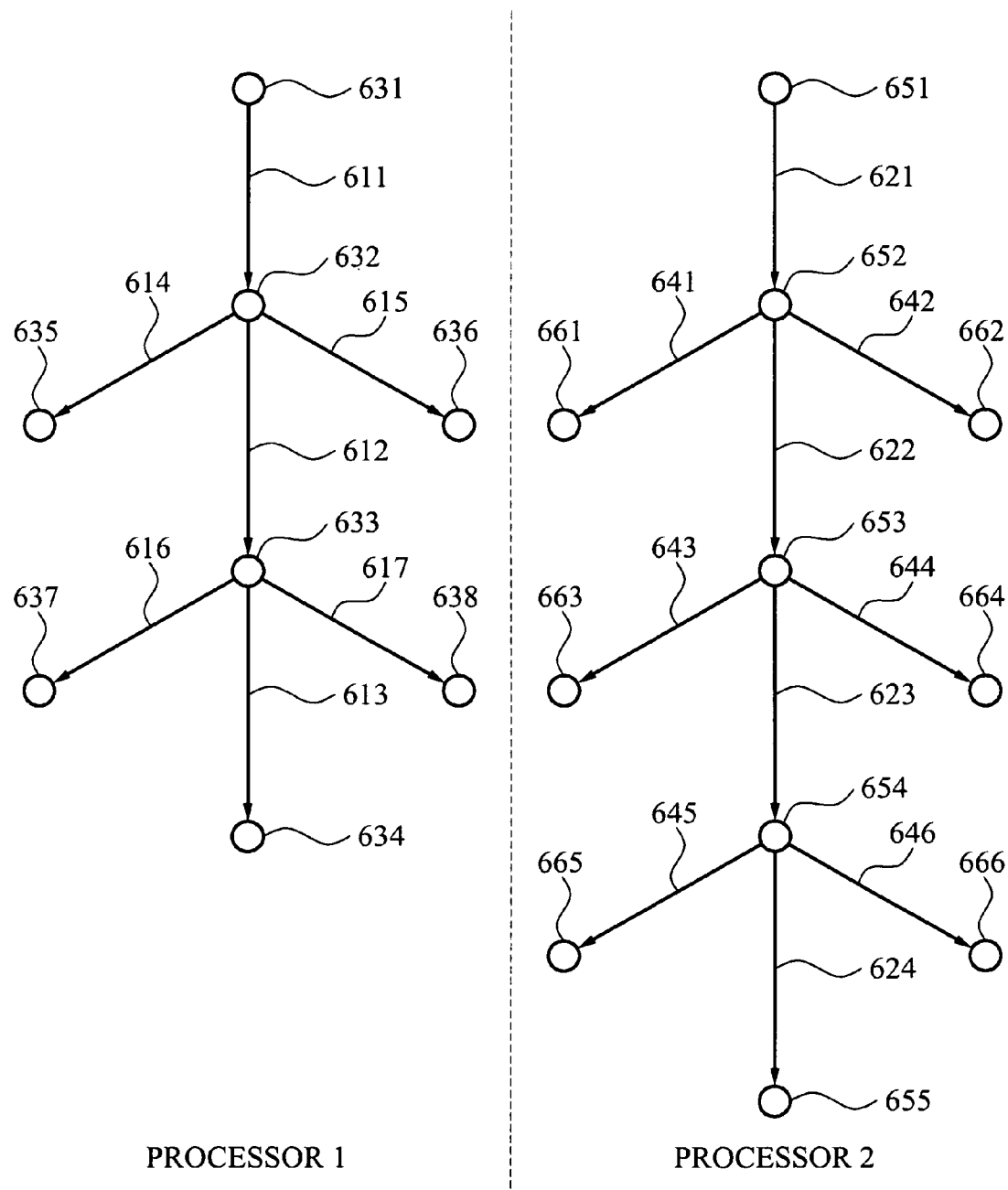
FIG. 6 illustrates a computation process performed during a second time interval according to at least the embodiment of FIG. 3.

FIG. 6 illustrates a computation process performed during a second time interval, according to the embodiment of FIG. 3.

Referring to FIGS. 3 and 6, processor (1) may be assigned to the sub-space 310, and processor (2) may be assigned to the sub-space 320.

Processor (1) may compute a trajectory of the ray 314 transmitted into the sub-space 310. The node 631 corresponds to the point 332.

An arrow 611 corresponds to the ray 314 transmitted into the sub-space 310.

A node 632 corresponds to a point where the ray 314 collides with a rear boundary of the sub-space 310.

Processor (1) may compute an advancing direction and coefficient of the ray 315 based on the advancing direction and intensity of the ray 314 and information about the rear boundary of the sub-space 310. Processor (1) may compute an advancing direction and coefficient of the shadow ray at the point where the ray 314 collides with the rear boundary of the sub-space 310, and then compute an advancing direction and coefficient of the transmission ray.

An arrow 614 corresponds to the shadow ray, and a node 635 corresponds to the shadow coefficient. An arrow 615 corresponds to the transmission ray, and a node 636 corresponds to the transmission coefficient. An arrow 612 corresponds to the reflection ray 315.

Processor (1) may detect whether the ray 315 has collided according to the advancing direction of the ray 315. When the ray 315 collides with a left boundary of the sub-space 310, processor (1) may compute a trajectory of the reflected ray 316. A node 633 corresponds to a point where the ray 315 collides with the left boundary of the sub-space 310.

Processor (1) may acquire a shadow ray and a transmission ray at a point corresponding to the node 633. An arrow corresponds to the shadow ray, and a node 637 corresponds to a shadow coefficient. An arrow 617 corresponds to the transmission ray, and a node 638 corresponds to a transmission coefficient.

An arrow 613 corresponds to a reflection ray 316. Processor (1) computes a trajectory of the ray 316 according to an advancing direction of the ray 316.

When the ray 316 strikes the virtual plane 330, processor (1) may store a coefficient and advancing direction of the ray 316 together with coordinates of the point 334. In this instance, processor (1) may store the node 635 acting as an ancestor of the ray 316, the shadow coefficient of the node 637, the node 636, and the transmission coefficient of the node 638, together with the coordinates of the point 334. Processor (1) may store information about the ray 316 and ancestor information together with the coordinates of the point 334, and terminate the computation process performed for the second time interval. A node 634 corresponds to the point 334.

Processor (1) may determine whether an intensity of the ray 316 is greater than a reference value. When the intensity of the ray 316 is less than the reference value, processor (1) may terminate the computation process with respect to the ray 316. In this instance, processor (2) may refrain from computing a trajectory within the sub-space 320 of the ray 316.

Processor (1) may add the intensity of the ray 316 and stored ancestor coefficients (or a product of coefficients) to thereby compute a color value in which the ray 316 affects pixels. The ray 316 results from the ray 322, and thereby the added value may be considered as a color value in which the ray 322 affects pixels.

The stored ancestor information (coefficients of the ancestors) may be considered as accompanying brightness (or color) generated whenever an advancing direction of the ray is changed.

Processor (1) may store all history information of the trajectory of the ray 316 by storing information about the ray 316 and a product of coefficients of the ancestors together with the coordinates of the point 334. Processor (1) may manage needed information without remembering a path of the ray or the coordinates of the preceding collision point by storing the ancestor information together with an intensity (or coefficient) of the ray 316.

Processor (2) computes a trajectory of the ray 324 transmitted into the sub-space 320 from the point 331.

An arrow 621 corresponds to the ray 324 transmitted into the sub-space 320.

A node 652 corresponds to a point where the ray 324 collides with a bottom boundary of the sub-space 320.

Processor (2) may compute an advancing direction and coefficient of the reflection ray 325 based on the advancing direction and intensity of the ray 324 and information about the bottom boundary of the sub-space 320. Processor (2) may compute an advancing direction and coefficient of the shadow ray at the point where the ray 324 collides with the bottom boundary of the sub-space 320, and also compute an advancing direction and coefficient of the transmission ray. Processor (2) may perform a vector operation of the ray 324, the reflection ray 325, the shadow ray, and the transmission ray, respectively, to thereby obtain a vector of each of the rays, and the advancing direction and coefficient of each of the rays from the obtained vectors.

An arrow 641 corresponds to the shadow ray, and a node 661 corresponds to the shadow coefficient. An arrow 642 corresponds to the transmission ray, and a node 662 corresponds to the transmission coefficient. An arrow 622 corresponds to the reflection ray 325.

Processor (2) may detect whether the ray 325 has collided according to the advancing direction of the ray 325. When the ray 325 collides with the virtual object 321, processor (2) may compute an advancing direction and coefficient of the reflection ray 326 based on the advancing direction and intensity of the ray 325, information about the boundary of the virtual object 321, and information about transparence of the virtual object 321. A node 653 corresponds to a point where the ray 325 collides with the virtual object 321.

Processor (2) may compute an advancing direction and coefficient of the shadow ray at a point corresponding to the node 653, and also compute an advancing direction and coefficient of the transmission ray.

An arrow 643 corresponds to the shadow coefficient, and a node 663 corresponds to the shadow coefficient. The arrow 644 corresponds to the transmission ray, and a node 664 corresponds to the transmission coefficient. An arrow 623 corresponds to the reflection ray 325.

When the ray 326 collides with a right boundary of the sub-space 320, processor (2) may compute a trajectory of the reflected ray 327. A node 654 corresponds to the point where the ray 326 collides with the right boundary of the sub-space 320.

Processor (2) may obtain the shadow ray and the transmission ray at the point corresponding to the node 654. An arrow 645 corresponds to the shadow ray, and a node 665 corresponds to a shadow coefficient. An arrow 646 corresponds to the transmission ray, and a node 666 corresponds to the shadow coefficient. An arrow 624 corresponds to the reflection ray 327.

Processor (2) computes a trajectory of the ray 327 according to an advancing direction of the ray 327.

When the ray 327 strikes the virtual plane 330, processor (2) may store a coefficient and advancing direction of the ray 327 together with coordinates of the point 333. In this instance, processor (2) may store the node 661 acting as an ancestor of the ray 327, the node 663, the shadow coefficient of the node 665, the node 662, and the node 666 together with the coordinates of the point 333. Processor (2) may store information about the ray 327 and ancestor information together with the coordinates of the point 333, and terminate the computation process performed for the second time interval. A node 655 corresponds to the point 333.

Figure 7:
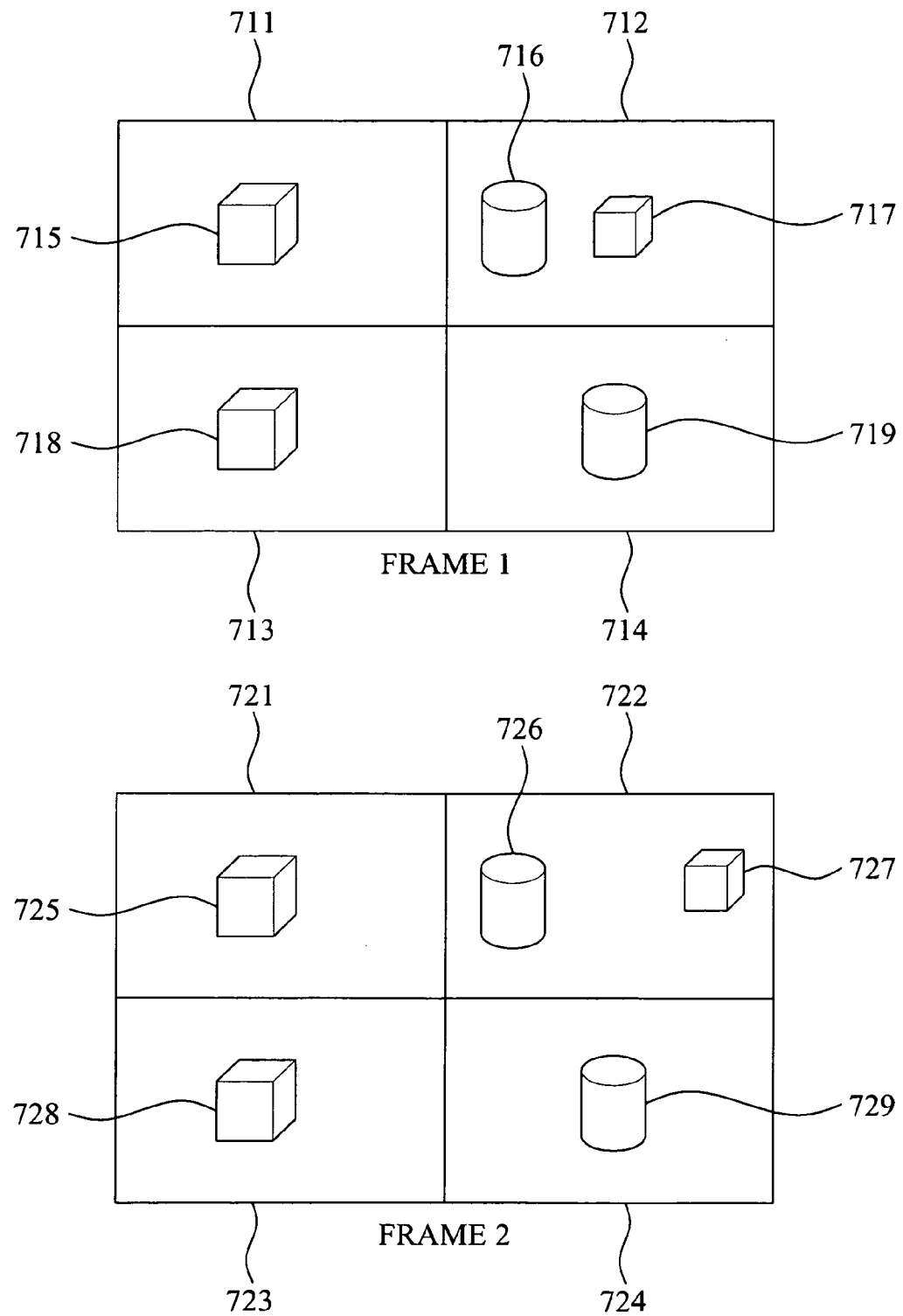
FIG. 7 illustrates a process for updating virtual 3D model data in a 3D image processing method, according to an embodiment of the present invention.

FIG. 7 illustrates a process for updating virtual 3D model data in the 3D image processing method, according to another embodiment of the present invention.

Referring to FIG. 7, two frames corresponding to an adjacent time are illustrated.

In frame (1), a virtual object space is divided into four sub-spaces 711, 712, 713, and 714, and in frame (2), the virtual object space is divided into another four sub-spaces 721, 722, 723, and 724.

The sub-space 711 of frame (1) and the sub-space 721 of frame (2) correspond to each other. Processor (1) (not shown) is assigned to the sub-space 711 in frame (1), and to the sub-space 721 in frame (2).

Virtual object 715 is located within the sub-space 711, and another virtual object 725 is located within the sub-space 721. The location of the virtual object 725 of frame (2) is identical to the location of the virtual object 715 of frame (1). In this instance, processor (1) may use 3D model data of the sub-space 711 of frame (1) as is in a ray tracing computation process with respect to frame (2).

As time passes, when the location of the virtual object 725 within the sub-space 721 is identical to the location of the virtual object 715 within the sub-space 711 of the preceding frame, processor (1) may be required to update the 3D model data of the sub-space 721.

The sub-space 712 of frame (1) and the sub-space 722 of frame (2) correspond to each other. Processor (2) (not shown) is assigned to the sub-space 712 in frame (1), and to the sub-space 722 in frame (2).

Virtual object 716 is located within the sub-space 712, and the virtual object 726 is located within the sub-space 722. The location of the virtual object 726 of frame (2) is identical to the location of the virtual object 716 of frame (1), however, the location of the virtual object 727 of frame (2) is different from the location of the virtual object 717 of frame (1).

Frame (2) updates the 3D model data of the sub-space 712 for the ray tracing computation process with respect to frame (2). As time passes, the location of the virtual object 727 within the sub-space 722 is different from the location of the virtual object 717 within the sub-space 712 of the preceding frame, and thereby processor (2) updates the 3D model data of the sub-space 722.

The sub-space 713 of frame (1) and the sub-space 723 of frame (2) correspond to each other. Processor (3) (not shown) is assigned to the sub-space 713 in frame (1), and to the sub-space 723 in frame (2).

Virtual object 718 is located within the sub-space 713, and virtual object 728 is located within the sub-space 723. When the location of the virtual object 728 of frame (2) is identical to the location of the virtual object 718 of frame (1), processor (3) may be required to update 3D model data of the sub-space 723.

The sub-space 714 of frame (1) and the sub-space 724 of frame (2) correspond to each other. Processor (4) (not shown) is assigned to the sub-space 714 in frame (1), and to the sub-space 724 in frame (2).

Virtual object 719 is located within the sub-space 714, and a virtual object 729 is located within the sub-space 724. When the location of the virtual object 729 of frame (2) is identical to the location of the virtual object 719 of frame (1), processor (4) may be required to update 3D model data of the sub-space 724.

A process for updating 3D model data requires large amounts of computation. The processors, according to embodiments of the present invention, may be required to update 3D model data with respect to a sub-space in which a location or a type of a virtual object within the sub-space is changed. Conversely, the processors may not be required to update the 3D model data with respect to the sub-space in which the location or type of the virtual object is not changed. The processors, according to embodiments of the present invention, may update the 3D model data with respect to each of a number of divided sub-spaces, thereby reducing a computation amount, and also reducing a time required for generating the 3D model data.

Figure 8:
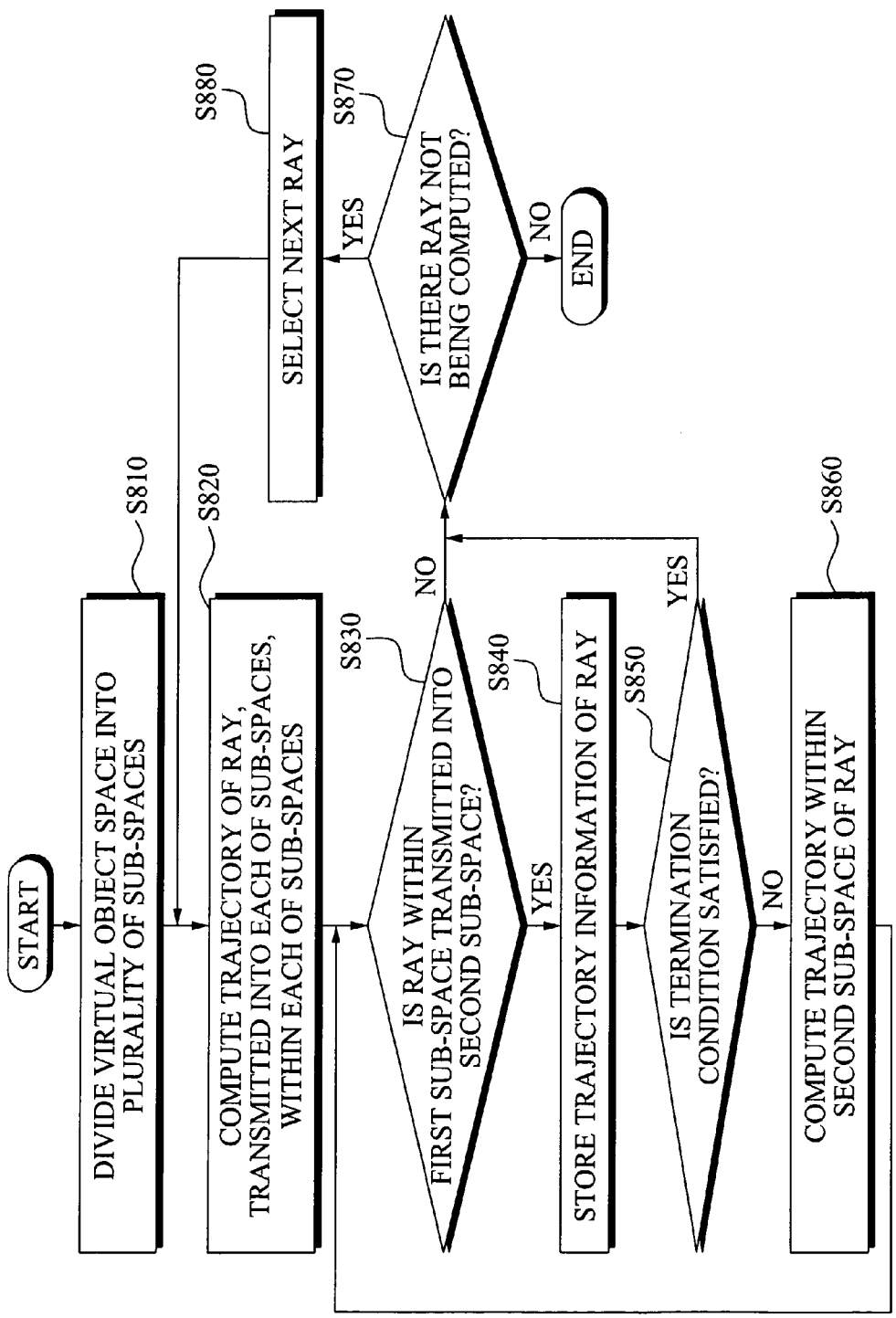
FIG. 8 illustrates a 3D image processing method, according to an embodiment of the present invention.

FIG. 8 illustrates a 3D image processing method according to an embodiment of the present invention.

Referring to FIG. 8, in operation S810, the 3D image processing method may divide a virtual object space, in which a virtual 3D object is located, into a plurality of sub-spaces.

In operation S820, the 3D image processing method may compute a trajectory within a sub-space of a ray transmitted into each of the divided sub-spaces.

In this instance, operation S820 is performed in parallel with respect to the differing sub-spaces.

In operation S830, the 3D image processing method may determine whether a ray within a first sub-space, from among the divided sub-spaces, is transmitted into a second sub-space.

In operation S840, the 3D image processing method may store trajectory information of an incident ray when a ray within the first sub-space is transmitted into the second sub-space.

The 3D image processing method may set a boundary between the divided sub-spaces as a virtual plane. The trajectory information may include a direction and intensity (or coefficients) of a ray at a point where the ray strikes the virtual plane of the first and second sub-spaces, and the preceding collision number.

In operation S850, the 3D image processing method may determine whether the stored trajectory information satisfies a termination condition.

The termination condition may be a condition in which an intensity of the ray included in the trajectory information is less than a reference value, or a condition in which the preceding collision number of the ray, included in the trajectory information, is greater than the reference value.

In operation S860, when the stored trajectory information fails to satisfy the termination condition, the 3D image processing method may compute a trajectory within the second sub-space of the ray from the stored trajectory information.

In this instance, operation S860 may be performed by a processor assigned to the second sub-space.

The 3D image processing method may perform operation S830 after performing operation S860. In this instance, operation S830 may determine whether the ray within the second sub-space is transmitted into either the first sub-space or a third sub-space.

In operation S870, the 3D image processing method may detect whether a ray not being computed exists according to the determined result of operation S850 when the stored trajectory information satisfies the termination condition.

In operation S870, the 3D image processing method may detect whether a ray not being computed exists when a ray within the first sub-space is not transmitted into the second sub-space according to the determined result of operation S830.

The 3D image processing method may terminate the computation when the ray not being computed does not exist according to the determined result of operation S870.

In operation S880, the 3D image processing method may select a next ray from among remaining rays when the ray not being computed remains.

The 3D image processing method may perform operation S820 with respect to the selected ray in operation S880.

The 3D image processing method according to the described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks, DVD disks and Blu Ray disks; magneto-optical media such as optical disks; and hardware devices that are specially configured to store and perform program instructions, such as read-only memory (ROM), random access memory (RAM), flash memory, and the like. The media may also be transmitted over a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A three-dimensional (3D) image processor, comprising:
    a space division unit to divide a virtual object space where a virtual 3D object is located into a plurality of sub-spaces; and
    a plurality of processors, wherein a respective processor of the plurality of processors corresponds to a respective sub-space of the divided sub-spaces and computes a trajectory of a ray within the respective sub-space, where the ray is transmitted into the respective sub-space, wherein a different processor computes the trajectory of the ray when the ray strikes a boundary of the respective sub-space, based on an advancing direction of the ray;
    wherein each processor of the plurality of processors computing the trajectory of the ray transmitted into the corresponding sub-space over an identical time interval, and
    wherein the space division unit divides the virtual object space into the plurality of sub-spaces such that a respective sub-space includes an equalized frequency of rays transmitted into the respective sub-space thereby making a relative computational complexity of each sub-space similar.

2. The 3D image processor of claim 1, wherein when a ray within a first sub-space from among the divided sub-spaces is transmitted into a second sub-space different from the first sub-space, a first processor corresponding to the first sub-space stores trajectory information of the ray, and a second processor corresponding to the second sub-space computes a trajectory of the transmitted ray within the second sub-space.

3. The 3D image processor of claim 2, wherein the space division unit sets a virtual plane as a boundary between the sub-spaces, and the second processor sets a point where the ray strikes the virtual plane between the first sub-space and the second sub-space as a virtual node and the second processor also computes the trajectory of the ray over a subsequent identical time interval assuming the ray is transmitted from the set virtual node to the second sub-space.

4. The 3D image processor of claim 2, wherein the trajectory information of the ray includes an angle and an intensity, each obtained when the ray is transmitted into the second sub-space.

5. The 3D image processor of claim 1, wherein each of the plurality of processors computes the trajectory in parallel with respect to each of the corresponding sub-spaces.

6. The 3D image processor of claim 1, wherein each of the plurality of processors calculates the trajectory of the ray, the trajectory being affected by at least one collision of the ray and the virtual 3D object within each of the corresponding sub-spaces.

7. The 3D image processor of claim 1, wherein each of the plurality of processors stores sub-space model data generated from the virtual 3D object of each of the corresponding sub-spaces, and updates the stored sub-space model data when the change of the virtual 3D object occurs within the corresponding sub-spaces.

8. The 3D image processor of claim 1, wherein each of the plurality of processors terminates the computation of the trajectory of the ray when a number of collisions between the ray and the virtual 3D object within each of the corresponding sub-spaces is greater than a threshold.

9. The 3D image processor of claim 1, wherein each of the plurality of processors terminates the computation of the trajectory of the ray when an intensity of each color of the ray is less than a threshold.

10. A 3D image processing method, comprising:
    dividing a virtual object space where a virtual 3D object is located into a plurality of sub-spaces; and
    computing a trajectory of a ray within each of the divided sub-spaces when the ray is transmitted into each of the divided sub-spaces, wherein
    the computing is performed in parallel with respect to another sub-space different from the sub-space into which the ray is transmitted by way of a plurality of processors and a single processor of the plurality of processors corresponds to a respective sub-space of the divided sub-spaces, the respective single processor performing all calculations relating to the trajectory of the ray in the respective sub-space, wherein a different processor computes the trajectory of the ray when the ray strikes a boundary of the respective sub-space, based on an advancing direction of the ray,
    wherein each processor of the plurality of processors computing the trajectory of the ray transmitted into the corresponding sub-space over an identical time interval, and
    wherein the virtual object space is divided into the plurality of sub-spaces such that a respective sub-space includes an equalized frequency of rays transmitted into the respective sub-space thereby making a relative computational complexity of each sub-space similar.

11. The 3D image processing method of claim 10, further comprising:
    storing, by way of a first processor, trajectory information of the ray when a ray within a first sub-space from among the divided sub-spaces is transmitted into a second sub-space being different from the first sub-space; and
    computing, by way of a second processor, a trajectory of the ray within the second sub-space based on the stored trajectory information.

12. The 3D image processing method of claim 11, further comprising:
    setting a virtual plane as a boundary between the divided sub-spaces,
    wherein the trajectory information of the ray includes a direction and intensity of the ray at a point where the ray strikes the virtual plane between the first sub-space and the second sub-space, and a number of preceding collisions.

13. A computer-readable recording medium storing a program for implementing the method of claim 10.

14. An apparatus performing three-dimensional (3D) image processing, the apparatus comprising:
- a space division unit to divide a virtual object space in which a virtual 3D object is located into a plurality of sub-spaces; and
- a plurality of processors, wherein a single processor of the plurality of processors corresponds to a respective sub-space of the divided sub-spaces and computes all calculations relating to a trajectory of a ray transmitted into the respective sub-space while the ray is located within the respective sub-space, wherein a different processor computes the trajectory of the ray when the ray strikes a boundary of the respective sub-space, based on an advancing direction of the ray,
- wherein each processor of the plurality of processors computing the trajectory of the ray transmitted into the corresponding sub-space over an identical time interval,
- wherein the space division unit divides the virtual object space into the plurality of sub-spaces such that a respective sub-space includes an equalized frequency of rays transmitted into the respective sub-space thereby making a relative computational complexity of each sub-space similar.

15. The apparatus performing 3D image processing of claim 14, wherein the computing of the calculations relating to the trajectory comprise one or more of: computing the trajectory of the ray within the corresponding sub-space; computing coordinates of a point where the ray strikes an object; and computing coefficients of sub-components of the ray where the ray strikes the object.

16. The apparatus performing 3D image processing of claim 15, wherein the sub-components of the ray include one or more of a reflection component, a transmission component and a shadow component.

17. The apparatus performing 3D image processing of claim 14, wherein the plurality of processors perform the calculations in parallel for each of the corresponding sub-spaces.

* * * * *